Jan. 28, 1930.   F. B. WILLIAMS   1,745,074
MILK BOTTLE RECEPTACLE
Filed April 10, 1928   2 Sheets-Sheet 1

Inventor

F. B. Williams

By Clarence A. O'Brien
Attorney

Jan. 28, 1930.　　　　F. B. WILLIAMS　　　　1,745,074
MILK BOTTLE RECEPTACLE
Filed April 10, 1928　　　2 Sheets-Sheet 2
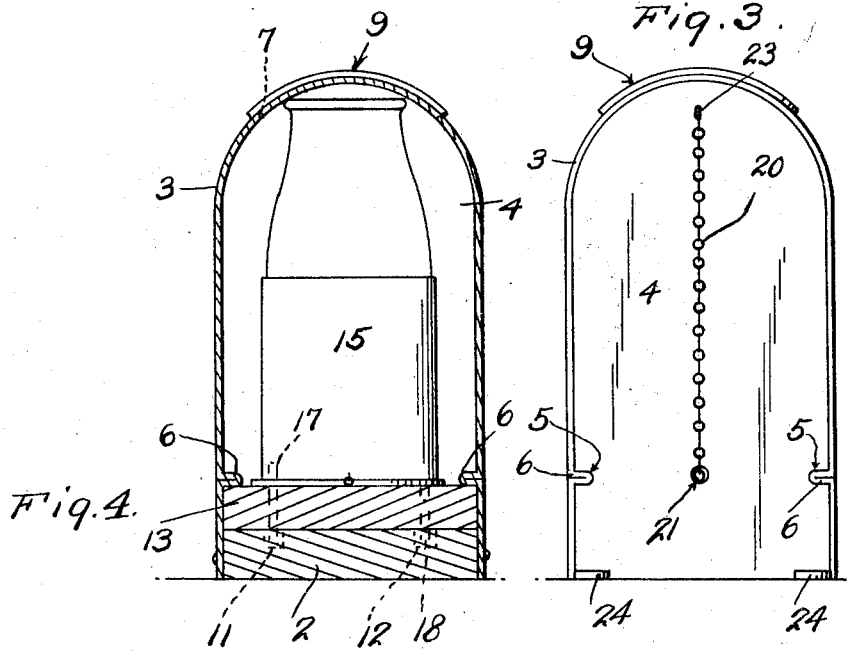
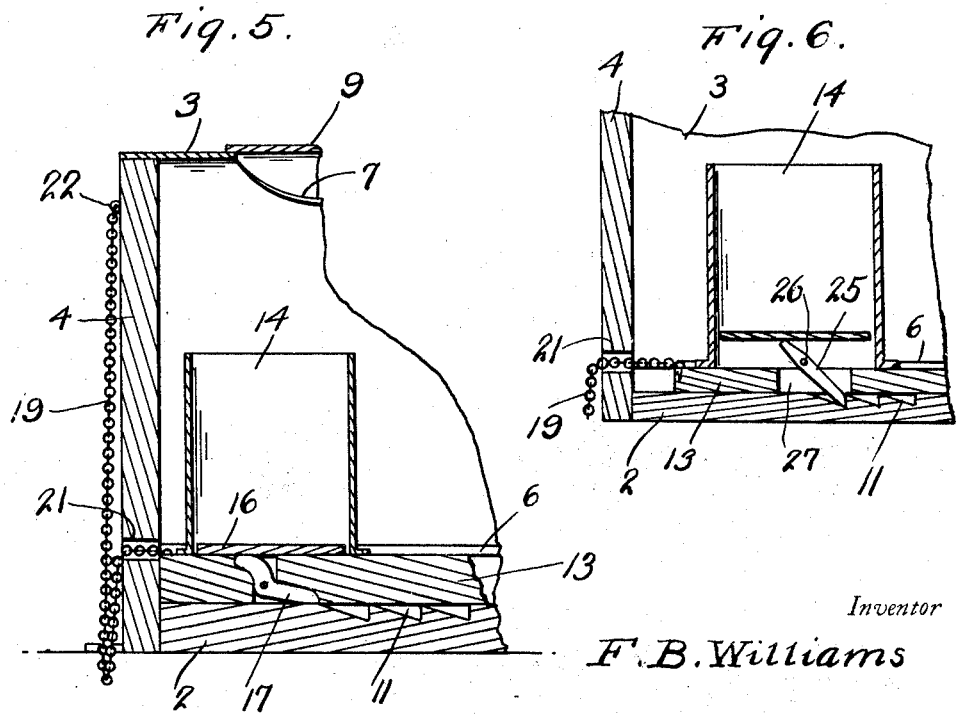
Inventor
F. B. Williams
By Clarence A. O'Brien
Attorney

Patented Jan. 28, 1930

1,745,074

UNITED STATES PATENT OFFICE

FOREST B. WILLIAMS, OF SHELBY, NORTH CAROLINA

MILK-BOTTLE RECEPTACLE

Application filed April 10, 1928. Serial No. 268,880.

The present invention relates to improvements in deposit and collection receptacles and has reference more particularly to a milk bottle receptacle for receiving full and empty bottles.

One of the important objects of the present invention is to provide a milk bottle receptacle wherein the milk man cannot remove an empty milk bottle deposited in the receptacle unless a full bottle of milk is placed in the receptacle, and in a similar manner the person to whom the milk is delivered cannot remove the full bottle of milk without placing an empty bottle in the receptacle in exchange.

A further object of the invention is to provide a milk bottle receptacle of the above mentioned character which will protect the bottles placed therein so that animals cannot obtain access thereto.

A still further object is to provide a milk bottle receptacle of the above mentioned character which includes a movable carriage having arranged thereon bottle receiving chambers, a pawl and ratchet mechanism being also arranged in the receptacle for locking the carriage or platform against sliding movement when the milk bottle chambers are unoccupied.

A further object is to provide a milk bottle receptacle of the above mentioned character which is simple in construction, inexpensive, strong and durable and further well adapted to the purpose for which it is designed.

Other objects and advantages of the invention will become apparent from the following description when taken in connection with the accompanying drawings.

In the accompanying drawings wherein like reference characters indicate corresponding parts through the several views thereof:

Figure 3 is an end elevation.

Figure 4 is a vertical sectional view taken approximately on the line 4—4 of Figure 1 looking in the direction of the arrows.

Figure 5 is a fragmentary detail view showing the slidable platform or carriage at the limit of its movement with the pivoted locking dog in an inoperative position, and Figure 6 is a sectional view through a portion of the milk bottle receptacle showing a modification of the locking means.

Figure 1:
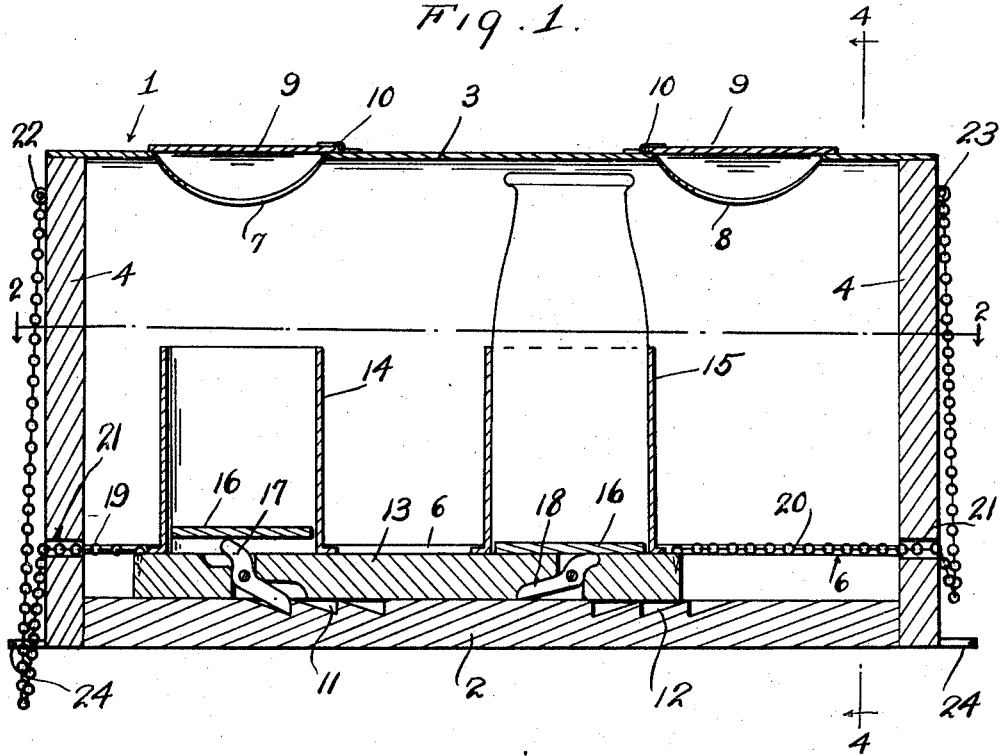
Figure 1 is a longitudinal sectional view through a milk bottle receptacle embodying my invention taken substantially upon the line 1—1 of Figure 2.

In the drawings wherein for the purpose of illustration is shown the preferred embodiment of my invention, the numeral 1 designates generally the milk bottle receptacle embodying my invention, the same including a rectangular shaped base 2 and a sheet metal casing 3 open at its respective end is secured at its lower free edges to the respective sides of the base by any appropriate fastening means, the top portion of the casing being slightly rounded as clearly shown in Figures 3 and 4 of the drawings.

End members 4 are arranged in the respective ends of the casing 3 to provide closures 4 therefor and each end member is formed in its side edges with the inwardly extending slots 5 to accommodate the inwardly disposed portions 6 of the respective sides of the sheet metal casing 3 and which inwardly disposed bent portions form guides or tracks that are arranged above the base 2 as clearly illustrated in Figure 4. These guides extend for the full length of the casing.

The top of the casing is formed with a pair of openings 7 and 8, respectively, the same being of such size as to permit a milk bottle to be easily passed therethrough. A spring pressed closure 9 is provided for each opening in the top of the casing, and these closures are hinged as at 10, axial coil springs being provided for normally maintaining the closures against the outer face of the top wall of the casing.

As is clearly shown in Figure 1, these openings are preferably located adjacent the respective ends of the receptacle.

Figure 2:
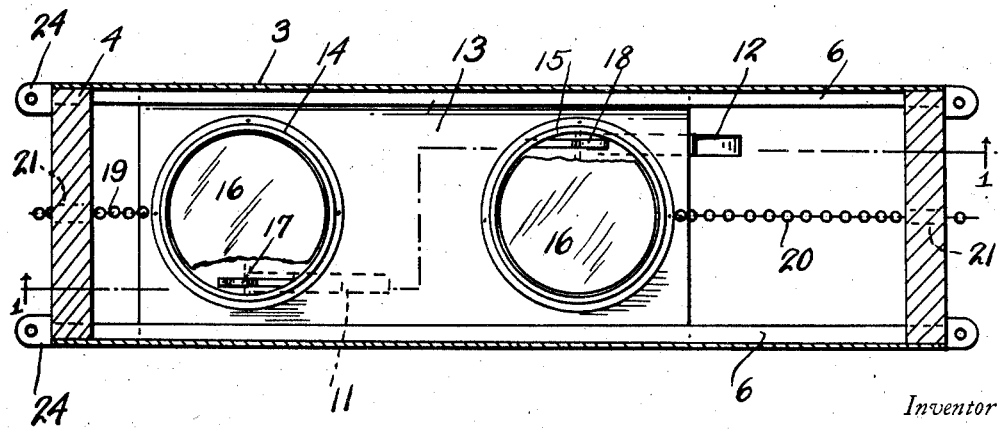
Figure 2 is a horizontal section taken on the line 2—2 of Figure 1.

Formed in the upper face of the base 1 adjacent one end thereof are the ratchet teeth 11, similar ratchet teeth 12 being formed in the same face of the base adjacent the other end and as is more clearly illustrated in Figure 2, the ratchet teeth 11 are disposed adjacent one side of the casing, while the ratchet teeth 12 are located adjacent the opposite side thereof.

Arranged for slidable movement along the upper face of the base 2 is the platform or carriage 13, the same being of such width as to be disposed between the inner opposed faces of the sides of the casing and furthermore the carriage or platform is arranged for slidable movement between the upper face of the base and the guides 6, as indicated very clearly in Figure 4. A pair of cylindrical milk bottle receiving chambers 14 and 15, respectively are secured on the upper face of the platform or carriage 13 adjacent the respective ends thereof, and each chamber is open at its respective ends. A rubber disc 16 is arranged in the lower end of each chamber and normally rests on the upper face of the platform or carriage.

A pivoted pawl or locking dog 17 is pivoted intermediate its ends in a suitable cut out portion provided therefor in the platform 13 directly below the chamber 14, the upper end of this dog or pawl having communication with the bottom portion of the chamber, while the lower end of the pawl is adapted to cooperate with the ratchet teeth 11 in the manner to be presently described. A similar pawl 18 is pivoted intermediate its ends in a cut out portion formed in the other end portion of the platform or carriage 13 for disposition directly below the chamber 15.

The carriage or platform is shorter than the base 2, and suitable pull chains 19 and 20 are secured to the respective ends of the carriage or platform. The chain 19 extends through an opening 21 provided therefor in the adjacent end wall of the casing and is secured at its upper end through a suitable screw eye 22 driven into the upper portion of the aforementioned end wall, and this chain is of sufficient length to permit a portion thereof to hang downwardly so that the same can be readily grasped by the person actuating the platform. The chain 20 extends through a similar opening formed in the other end wall and the other end of this particular chain is secured to the upper portion of the opposite end wall through the medium of the screw eye 23.

The receptacle may be anchored by driving any suitable securing means through the apertured ears 24 located at the respective corners of the base portion of the receptacle.

The operation of the device may be briefly stated as follows. Presuming that the milkman has delivered a bottle of milk and has placed the same in the chamber 15 and has removed the empty bottle from the chamber 14, by pulling the carriage or platform 13 toward the left, it will be observed that the weighted pivoted pawl 17 will engage with the ratchet teeth 11 so that said carriage cannot be moved to the opposite end of the casing and consequently the bottle of milk is disposed out of alinement with the opening 8. In order for a person to obtain a full bottle of milk deposited in the receptacle in the chamber 15, it is necessary for such a person to deposit an empty bottle in the chamber 14 and the weight of the bottle will act on the upper end of the pawl 17 to lift the same upwardly out of engagement with the ratchet teeth 11 and then by pulling outwardly on the chain 20, the platform is free to slide over the upper face of the base 2 until the chamber 15 is in alinement with the opening 8 whereupon the full bottle of milk may be removed from the chamber by swinging the hinged closure 9 upwardly.

As soon as the full bottle of milk has been removed, the weighted pawl 18 will swing downwardly and will engage with the ratchet teeth 12 so that the empty bottle will not be in alinement with the opening 7, and consequently the carriage cannot be moved to the left hand side of the casing until the chamber 15 is again filled by the milk man. The rubber disc 16 acts as a cushioning means for the bottle.

In Figure 6 of the drawings, I have shown a modification wherein the weighted pawl 25 is pivotally associated with the lower portion of each chamber, as at 26, and the pawl extends through an elongated slot 27 provided therefor in the carriage or platform 13 for engagement with the respective ratchet teeth.

In Figure 5 of the drawings there is disclosed the position of the chamber 14 when the carriage 13 has been moved to its extreme position whereupon the end of the carriage engages with the adjacent end wall and the chamber 15 is then out of alinement with the opening 7, and the pivoted pawl 17 is in an inoperative position so that the same does not engage with the ratchet teeth 11, and the rubber pad or cushion 16 rests on the upper face of the platform or carriage.

It will thus be seen from the foregoing description, that I have provided a milk bottle receptacle which will necessitate the replacement of a bottle that is removed from the receptacle with another one before the movable carriage or platform carrying the bottle holding chambers can be actuated.

The simplicity of my device enables the parts to be readily and easily operated, and furthermore by providing an enclosure for the milk bottles, the same will be protected from animals, and also from the elements.

While I have shown the preferred embodiment of my invention it is to be understood that minor changes in the size, shape and arrangement of parts may be resorted to without departing from the spirit of the invention and the scope of the appended claims.

Having thus described the invention, what

I claim as new and desire to secure by Letters Patent is:—

1. In a milk bottle receptacle of the class described, a casing provided with a pair of bottle receiving openings in its top, a member slidable longitudinally in the bottom of the casing, bottle receiving chambers arranged on the upper face of the slidable member, one of said chambers being out of registration with one of the openings in the top of the casing when the other chamber is in communication with its respective opening, means for actuating said slidable member, and means for locking the member against sliding movement when either one of the chambers is empty.

2. In a milk bottle receptacle of the class described, a casing provided with a pair of bottle receiving openings in its top, a member slidable longitudinally in the bottom of the casing, bottle receiving chambers arranged on the upper face of the slidable member, one of said chambers being out of registration with one of the openings in the top of the casing when the other chamber is in communication with its respective opening, means for actuating said slidable member, means for locking the member against sliding movement when either one of the chambers is empty, said last mentioned means including a pawl and ratchet mechanism associated with the movable member and the bottom of the casing respectively.

3. In a milk bottle receptacle of the class described, a casing provided with a pair of bottle receiving openings in its top, a member slidable longitudinally in the bottom of the casing, bottle receiving chambers arranged on the upper face of the slidable member, one of said chambers being out of registration with one of the openings in the top of the casing when the other chamber is in communication with its respective opening, means for actuating said slidable member, means for locking the member against sliding movement when either one of the chambers is empty, said last mentioned means including a pair of pivoted pawls having their upper ends extending into the bottom of the respective chambers, ratchet teeth formed in the bottom of the casing in a predetermined manner, and with which the lower ends of the respective pawls cooperate said pawls being held out of engagement with the respective ratchet teeth by the weight of the articles placed in the chambers and resting upon the upper ends of the pawls.

4. In a milk bottle receptacle of the class described, a casing provided with a pair of bottle receiving openings in its top, a member slidable longitudinally in the bottom of the casing, bottle receiving chambers arranged on the upper face of the slidable member, one of said chambers being out of registration with one of the openings in the top of the casing when the other chamber is in communication with its respective opening, means for actuating said slidable member, means for locking the member against sliding movement when either one of the chambers is empty, said first mentioned means including a flexible member secured at one end to each end of the slidable member, the other ends of said flexible members extending outwardly of the ends of the casing.

5. A structure of the class described, a base, a casing over said base, the top of the casing being provided with a pair of bottle receiving openings, ratchet teeth formed in the upper face of the base in a predetermined manner, a carriage arranged for slidable movement along the upper face of the base, said carriage being shorter than the base, milk bottle receiving chambers carried by the upper face of the slidable carriage and arranged in such a manner that one of the chambers is out of communication with one of the openings in the top of the casing when the other chamber is in registration with the other of said openings, the respective ends of the chambers being open, a pair of pivoted pawls having their upper ends extending into the open bottom of the respective chambers, the lower ends of the pawls being adapted for engagement with the respective ratchet teeth, said pawls being disposed out of engagement with the ratchet teeth when the chambers are occupied, the pawls cooperating with the ratchet teeth to lock the carriage against sliding movement when one of the chambers is empty, and means for actuating the carriage.

6. In a milk bottles receptacle of the class described, a casing provided with a pair of bottle receiving openings in its top, a member slidable longitudinally in the bottom of the casing, bottle receiving chambers arranged on the upper face of the slidable member, one of said chambers being out of registration with one of the openings in the top of the casing when the other chamber is in communication with its respective openings, means for actuating said slidable member, means for locking the member against sliding movement when either one of the chambers is empty, said last mentioned means including a pair of pivoted pawls having their upper ends extending into the bottom of the respective chambers, ratchet teeth formed in the bottom of the casing, said pawls being held out of engagement with the respective ratchet teeth by the weight of the articles placed in the chambers for rest upon the upper ends of the pawls, and bottle cushioning elements arranged within the respective chambers for rest upon the upper ends of the pawls.

In testimony whereof I affix my signature.

FOREST B. WILLIAMS.